United States Patent
Min et al.

(10) Patent No.: US 9,598,302 B2
(45) Date of Patent: Mar. 21, 2017

(54) FLOAT BATH AND METHOD FOR MANUFACTURING FLOAT GLASS

(71) Applicant: LG CHEM, LTD, Seoul (KR)

(72) Inventors: Kyoung-Hoon Min, Daejeon (KR); Ye-Hoon Im, Daejeon (KR); Su-Chan Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 82 days.

(21) Appl. No.: 14/480,217

(22) Filed: Sep. 8, 2014

(65) Prior Publication Data

US 2014/0378293 A1 Dec. 25, 2014

Related U.S. Application Data

(63) Continuation of application No. PCT/KR2013/004774, filed on May 30, 2013.

(30) Foreign Application Priority Data

May 30, 2012 (KR) .................. 10-2012-0057508
May 30, 2013 (KR) .................. 10-2013-0061556

(51) Int. Cl.
*C03B 18/06* (2006.01)
(52) U.S. Cl.
CPC .................. *C03B 18/06* (2013.01)
(58) Field of Classification Search
CPC .................................................. C03B 18/06
See application file for complete search history.

(56) References Cited

U.S. PATENT DOCUMENTS

| | | | |
|---|---|---|---|
| 3,351,452 A | 11/1967 | Robinson | |
| 3,395,996 A * | 8/1968 | Loukes | C03B 18/06 65/157 |
| 3,468,649 A * | 9/1969 | Bourgeaux | C03B 18/06 65/182.4 |
| 3,468,651 A * | 9/1969 | Boaz | C03B 18/06 65/182.4 |
| 3,850,787 A | 11/1974 | Robinson et al. | |
| 3,871,854 A * | 3/1975 | Milnes | C03B 18/06 65/182.4 |
| 4,013,438 A | 3/1977 | Gladieux et al. | |
| 4,055,407 A | 10/1977 | Heithoff et al. | |

(Continued)

FOREIGN PATENT DOCUMENTS

GB 1158958 A 7/1969
GB 1381625 A 1/1975

(Continued)

*Primary Examiner* — Queenie Dehghan
(74) *Attorney, Agent, or Firm* — Dentons US LLP

(57) ABSTRACT

The present disclosure discloses a float bath that may enhance spreadability of a poured glass melt when pouring the glass melt, an apparatus for manufacturing a float glass comprising the same, a method for manufacturing a float glass using the float bath, and a float glass produced by the method. The float bath according to the present disclosure receives a metal melt and allows a glass melt poured onto the metal melt to float and move from upstream to downstream, and includes a guiding unit provided at a part where the glass melt is poured, to come into contact with the side of the poured glass melt to guide a sidewise spreading path of the glass melt to expand sidewise spreading of the glass melt.

9 Claims, 9 Drawing Sheets

(56) References Cited

U.S. PATENT DOCUMENTS

| | | | |
|---|---|---|---|
| 4,116,661 A | | 9/1978 | Edge et al. |
| 4,152,135 A | | 5/1979 | Kapura |
| 6,089,043 A | * | 7/2000 | Courtemanche ........ C03B 18/06 65/182.4 |
| 2007/0101766 A1 | | 5/2007 | Loeffelbein et al. |
| 2010/0206010 A1 | | 8/2010 | Na et al. |

FOREIGN PATENT DOCUMENTS

| JP | 42-22390 B | 11/1967 |
|---|---|---|
| JP | 54-65722 A | 5/1979 |
| JP | 06227830 A | 8/1994 |
| KR | 10-2007-0050359 A | 5/2007 |
| KR | 10-2010-0092709 A | 8/2010 |
| KR | 20100091949 A | 8/2010 |

\* cited by examiner

FLOAT BATH AND METHOD FOR MANUFACTURING FLOAT GLASS

CROSS-REFERENCE TO RELATED APPLICATION

The present application is a continuation of International Application No. PCT/KR2013/004774 filed on May 30, 2013, which claims priority to Korean Patent Application No. 10-2012-0057508 filed in the Republic of Korea on May 30, 2012, and Korean Patent Application No. 10-2013-0061556 filed in the Republic of Korea on May 30, 2013, the disclosures of which are incorporated herein by reference.

TECHNICAL FIELD

The present disclosure relates to a technique for manufacturing a float glass, and more particularly, to a float bath that may enhance spreadability of a poured glass melt when pouring the glass melt, an apparatus for manufacturing a float glass comprising the same, a method for manufacturing a float glass using the float bath, and a float glass produced by the method.

BACKGROUND ART

Many types of flat glasses are being used in various fields such as a window glass, an automobile window screen, a mirror, and the like. A flat glass may be manufactured by various techniques, and among them, a typical technique is a production technique using a float method. For example, a thin glass plane or a glass film for a thin-film-transistor (TFT) display is manufactured primarily by a float method, and a glass manufactured by a float method is called a float glass.

A method for manufacturing a float glass includes a continuous circulation process, and is gaining attention as a typical method for manufacturing a flat glass in that the method is operable discontinuously and permanently, for example, for at least several years almost without interruption as possible.

FIG. 1 is a diagram schematically illustrating a partial construction of an apparatus for manufacturing a float glass according to a related art.

As shown in FIG. 1, a float glass is generally formed using a float bath 10 in which a metal melt M such as a tin melt or a tin alloy melt is stored and circulates. In this instance, a glass melt having a lower viscosity than the metal melt M and being lighter by approximately ⅔ than the metal melt M is continuously supplied into the float bath 10 through an inlet of the float bath 10 via a spout lip 11. Inside the float bath 10, the glass melt G moves to a downstream side of the float bath 10 while the glass melt G is floating and spreading on the metal melt M. In this process, the glass melt G reaches roughly an equilibrium thickness by the effects of its surface tension and the gravity, so a glass strip or ribbon solidified to some extent is formed.

Subsequently, the glass melt is pulled toward an annealing furnace by a lift out roller adjacent to an outlet of the float bath to pass through an annealing process. In this instance, a thickness of a resulting glass may change by adjusting and changing an amount of glass poured through the inlet, a pulling rate determined by a rotation rate of rollers, and a forming means such as top rollers installed in a float chamber.

FIG. 2 is a diagram illustrating a spreading shape of the glass melt poured through the inlet of the float bath according to the related art, when viewed from the top of the float bath. In FIG. 2, an arrow denotes a movement direction of the glass melt.

Referring to FIG. 2, the metal melt M is received by an inner wall 12 of the float bath, and the glass melt G is provided from the spout lip 11 onto the metal melt M. Also, the provided glass melt G gradually spreads in a widthwise direction while moving in a downstream direction of the float bath 10. That is, as seen in the drawing, the glass melt G gradually spreads in upper and lower directions (widthwise direction) of the drawing while moving in a left to right direction of the drawing. In this instance, ends of the glass melt G in the widthwise direction are indicated by 'a' in FIG. 2. Like this, the glass melt G moves in the downstream direction while spreading in the widthwise direction in a state that the glass melt G floats on the metal melt M, and in this instance, a spreading shape and a spreading speed of the glass melt G may be determined by a density of glass, an atmospheric gas, a metal melt, a viscosity of glass, an interfacial tension between glasses, and the like.

However, when the spreading speed of the glass melt poured onto the metal melt is low, to manufacture a wide float glass, the problem that the float bath 10 should have a sufficient length is posed. Accordingly, it is advantageous to use a glass melt spreading fast as possible.

Conventionally, to increase the spreading speed of the glass melt, a high temperature driving condition method has been widely used. The high temperature driving condition method is a method that increases an upstream temperature of the float bath 10 to increase temperature of a glass melt and consequently to spread the glass melt fast.

However, this method using high temperature requires high cooling performance of the float bath 10 as well as a high amount of power. Also, because the high temperature driving condition may shorten the life of refractories constituting the float bath 10, it is unfavorable in an aspect of management of an apparatus. Furthermore, when a glass melt supply condition or a driving condition changes at an upstream of the float bath 10 where the glass melt spreads, formation of a glass ribbon may become unstable, and high temperature driving method is problematic in that unstability may be worsened.

DISCLOSURE

Technical Problem

The present disclosure is designed to solve the above problem, and therefore, the present disclosure is directed to providing a float bath that may increase a spreading speed of glass, without high temperature driving, to spread a glass ribbon in a widthwise direction fast enough to expand an area over which the glass ribbon spreads, and an apparatus and method for manufacturing a float glass using the same.

These and other objects and aspects of the present disclosure can be understood by the following description, and will become apparent from the embodiments of the present disclosure. Also, it should be understood that these and other objects and aspects of the present disclosure may be achieved by any means in the scope of the disclosure and combinations thereof.

Technical Solution

To achieve the above objects, a float bath according to the present disclosure receives a metal melt and allows a glass melt poured onto the metal melt to float and move from upstream to downstream, and includes a guiding unit provided at a part where the glass melt is poured, coming into contact with the sides of the poured glass melt to guide a sidewise spreading path of the glass melt to expand sidewise spreading of the glass melt.

Preferably, the guiding unit includes a left guiding unit and a right guiding unit, and the left guiding unit and the right guiding unit have a symmetrical shape.

Also, preferably, the guiding unit is disposed such that a bottom of the guiding unit is level with a top of the metal melt.

Also, preferably, the guiding unit has a downstream side end in the float bath reducing in height toward an edge.

Also, preferably, the guiding unit includes, in the upstream to downstream direction of the float bath, an expanding part to expand the sidewise spreading of the glass melt, and a leaving part to allow the glass melt to leave.

More preferably, the guiding unit further includes a stabilizing part to stabilize a spreading speed of the glass melt.

Also, preferably, the stabilizing part is constructed such that a lengthwise direction of a part coming into contact with the side of the glass melt forms an angle between 0° and 10° with a travel direction of the glass melt.

Also, preferably, at least a portion of a part of the expanding part coming into contact with the side of the glass melt is formed in a curved shape along a travel direction of the glass melt.

Also, preferably, the expanding part is constructed such that a tangent direction of a part the poured glass melt initially comes into contact forms an angle between 10° and 30° with a lengthwise direction of the side of the glass melt before the contact with the expanding part.

Also, preferably, the expanding part is constructed to have a radius of curvature greater 1 to 5 times than a width of the glass melt at a shortest end of the guiding unit.

Also, to achieve the above objects, an apparatus for manufacturing a float glass according to the present disclosure includes the above float bath.

Also, to achieve the above objects, a method for manufacturing a float glass according to the present disclosure is a method for manufacturing a float glass using a float bath receiving a metal melt, and includes the steps of disposing a guiding unit, at a part where the glass melt is poured onto the metal melt, coming into contact with the side of the poured glass melt, to guide a sidewise spreading path of the glass melt to expand sidewise spreading of the glass melt, and pouring the glass melt onto the metal melt at a part where the guiding unit is disposed.

Preferably, the disposing of the guiding unit includes disposing a left guiding unit and a right guiding unit having a symmetrical shape at both sides of the float bath.

Also, preferably, the disposing of the guiding unit includes disposing the guiding unit such that a bottom of the guiding unit is level with a top of the metal melt.

Also, preferably, the disposing of the guiding unit includes disposing the guiding unit such that a downstream side end of the guiding unit in the float bath reduces in height toward an edge.

Also, to achieve the above objects, a float glass according to the present disclosure is a glass manufactured by the above method for manufacturing the float glass.

Advantageous Effects

According to the present disclosure, when pouring a glass melt into a float bath, a spreading characteristic of the poured glass melt may be enhanced. That is, according to the present disclosure, the poured glass melt may spread well on a metal melt in left and right side directions (widthwise direction) at a high speed through a guiding unit. Particularly, according to the present disclosure, an area over which the glass melt spreads in the sidewise direction may be expanded when compared to a conventional float bath.

Thus, there is no need to maintain the glass melt in a high temperature state for the purpose of spreading the glass melt at a high speed. Accordingly, power consumption or a cooling air amount required for maintaining the glass melt in the high temperature state may reduce, resulting in a reduction in float glass manufacturing costs and time.

Also, in the high temperature state, a change in glass supply condition or driving condition may further increase unstability of a glass ribbon, but because the present disclosure may lower the temperature, the unstability of the glass ribbon may lessen. Therefore, a high quality float glass may be produced.

Furthermore, according to the present disclosure, because the glass melt spreads quickly in the widthwise direction, a length of the float bath in an upstream to downstream direction may reduce.

DESCRIPTION OF DRAWINGS

The accompanying drawing illustrates a preferred embodiment of the present disclosure and together with the foregoing disclosure, serves to provide further understanding of the technical spirit of the present disclosure. However, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 3:
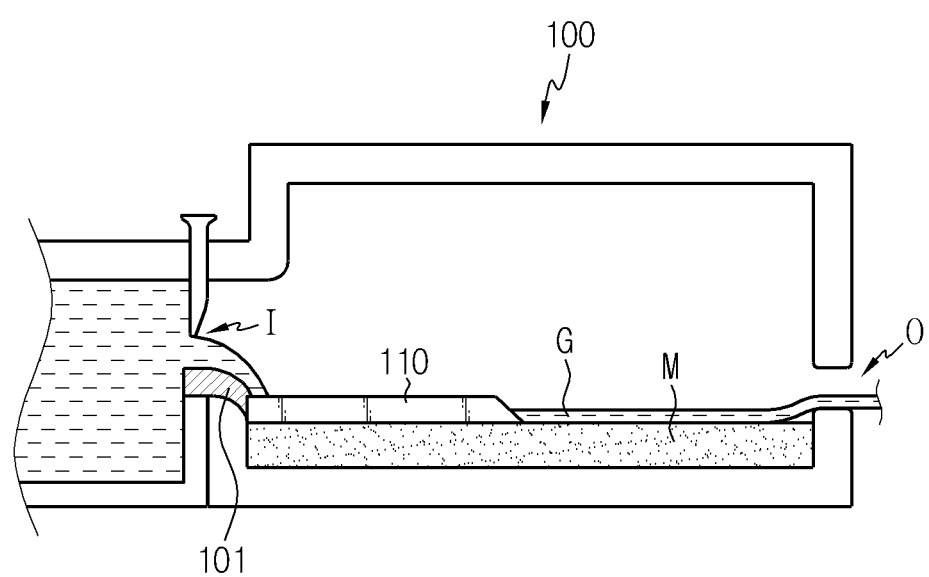
FIG. 3 is a diagram schematically illustrating construction of a float bath according to an exemplary embodiment of the present disclosure when viewed from the side.

FIG. 3 is a diagram schematically illustrating construction of a float bath 100 according to an exemplary embodiment of the present disclosure when viewed from the side. However, for the convenience of description, a side wall of the float bath 100 is not illustrated in FIG. 3. Also, the float bath 100 may include an element such as a top roller, a roof heater, a vent, and the like, but these elements are not illustrated in FIG. 3 and characteristic elements of the present disclosure are mainly illustrated.

Referring to FIG. 3, the float bath 100 holds a metal melt M such as a tin melt or a tin alloy melt. Also, a glass melt G is poured onto the metal melt M. That is, when the glass melt G is poured through an inlet I of the float bath via a spout lip 101, the poured glass melt G moves from upstream of the float bath 100 to downstream in a state that the glass melt G floats on the metal melt M. Here, the upstream of the float bath 100 represents a part at the side of the inlet I of the float bath where the glass melt G is poured, and the downstream of the float bath 100 represents a part at the side of the outlet O of the float bath from which the glass melt G is discharged in a form of a glass ribbon. In FIG. 3, a left side of the float bath 100 is the upstream side part, and a right side of the float bath 100 is the downstream side part.

Particularly, the float bath 100 according to the present disclosure includes a guiding unit 110.

The guiding unit 110 comes into contact with the side of the glass melt G when the glass melt G is poured, and may guide a sidewise spreading path of the poured glass melt G. Further, when the poured glass melt G spreads in the sidewise direction, the guiding unit 110 may guide the sidewise spreading path to expand the sidewise spreading of the glass melt G. That is, the guiding unit 110 is a member that may determine a spreading shape of the glass melt G. For this, the guiding unit 110 may be equipped at the side of at least a part where the glass melt G is poured, that is, at the side of the inlet (upstream) of the float bath 100. A shape and function of the guiding unit 110 is described in further detail with reference to FIGS. 4 and 5.

Figure 4:
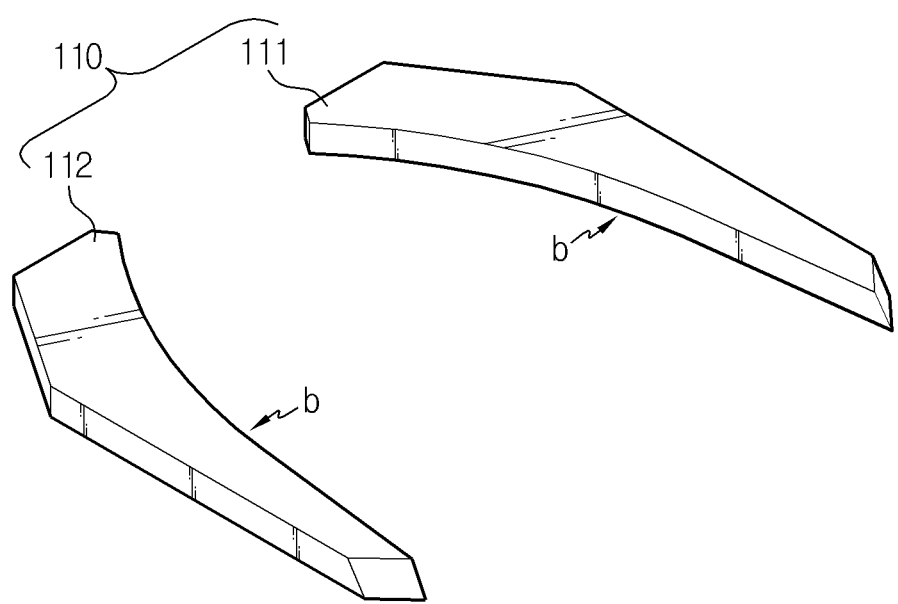
FIG. 4 is a perspective view schematically illustrating construction of a guiding unit according to an exemplary embodiment of the present disclosure.
Figure 5:
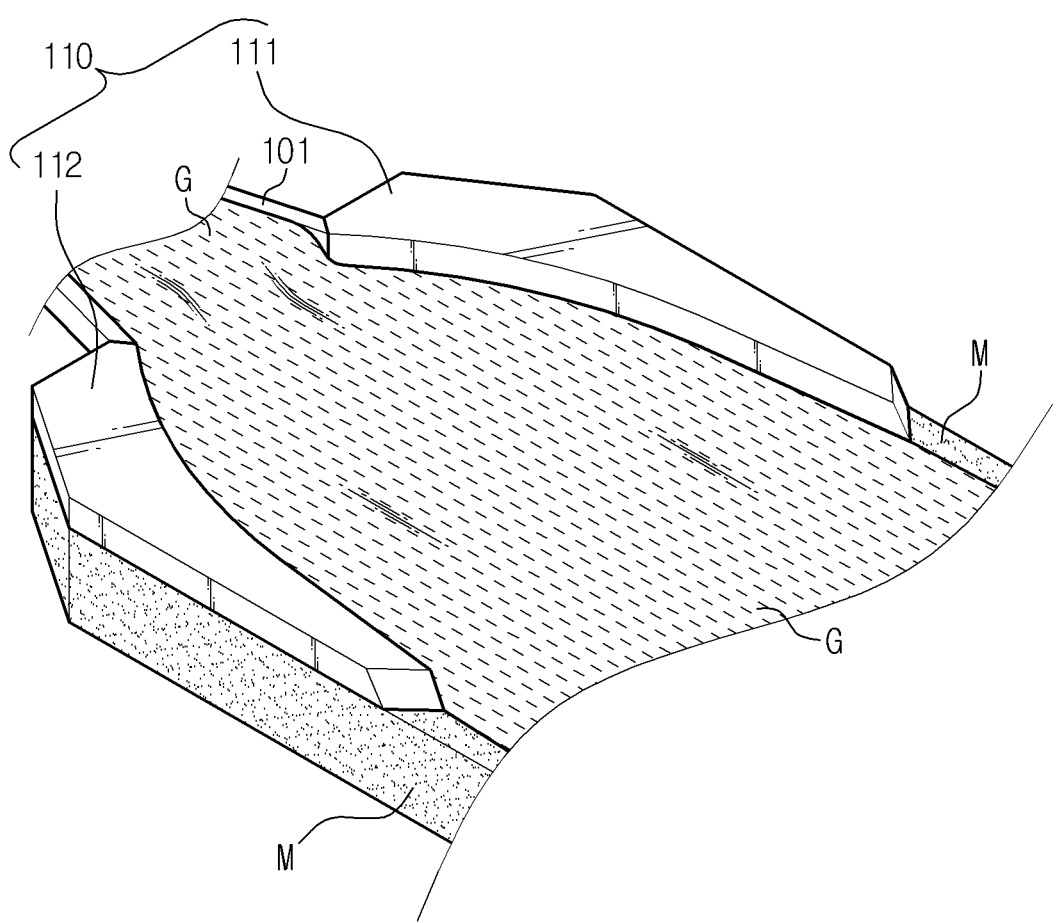
FIG. 5 is a perspective view schematically illustrating construction in which the guiding unit of FIG. 4 is applied to a float bath.

FIG. 4 is a perspective view schematically illustrating construction of the guiding unit 110 according to an exemplary embodiment of the present disclosure, and FIG. 5 is a perspective view schematically illustrating construction in which the guiding unit 110 of FIG. 4 is applied to the float bath 100. However, for the convenience of description, an inner wall of the float bath 100 and the like is not illustrated in FIG. 5.

Referring to FIGS. 4 and 5, the guiding unit 110 may include two guiding units 110, that is, a left guiding unit 111 and a right guiding unit 112. Also, the left guiding unit 111 and the right guiding unit 112 have a symmetrical shape with respect to a center line extending in an upstream to downstream direction of the float bath 100. Accordingly, the guiding unit 110 may be equipped at both sides at the upstream of the float bath 100. That is, the left guiding unit 111 may be equipped at the left side at the upstream of the float bath 100, and the right guiding unit 112 may be equipped at the right side at the upstream of the float bath 100. However, in FIGS. 4 and 5, a concept of left and right is set when viewed from the upstream of the float bath 100 facing the downstream, but it is obvious that the concept of left and right may change based on the reference, and this will be applied equally to the following description.

The guiding unit 110 may come into contact with the side of the glass melt G along an inner side part indicated by 'b' in FIG. 4. Here, the side of the glass melt G represents left and right ends of the glass melt G in the widthwise direction when the glass melt G is supplied through the inlet of the float bath 100 and spreads out in a state that the glass melt G floats on the metal melt M. Like this, when the glass melt G is poured into the float bath 100 and spreads out on the metal melt M, the glass melt G may spread along the inner side of the guiding unit 110 while coming into contact with the inner side of the guiding unit 110, so interfacial tension may not occur at the side of the glass melt G. Thus, according to the present disclosure, the glass melt G poured from the inlet of the float bath 100 may spread fast in the widthwise direction, that is, in the left and right side directions of the float bath 100.

Figure 6:
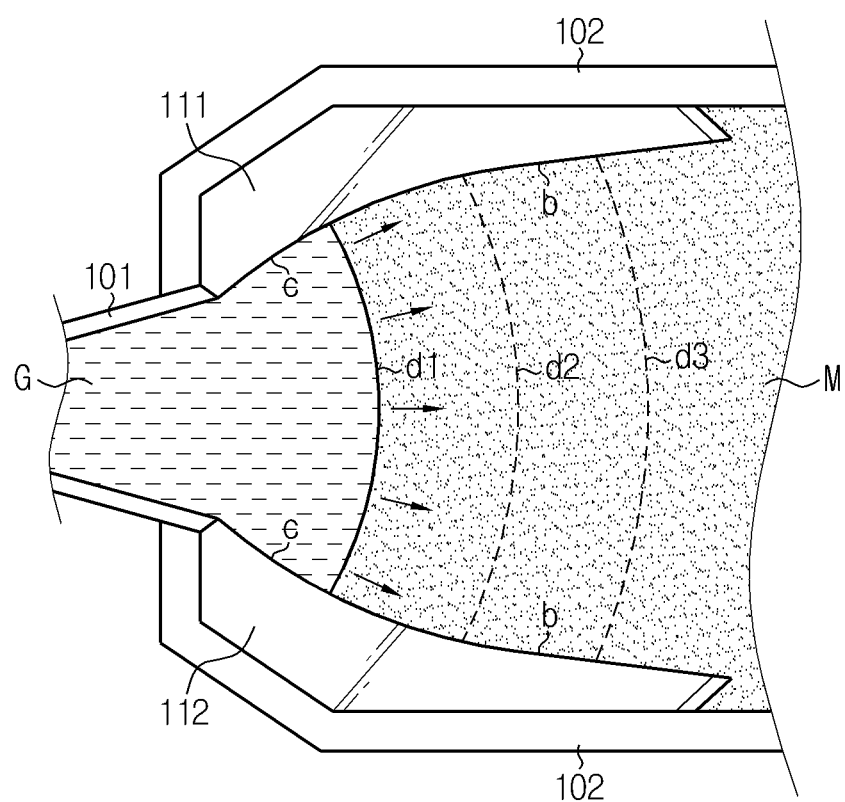
FIG. 6 is a top view illustrating a spreading shape of a glass melt in a float bath according to an exemplary embodiment of the present disclosure.

FIG. 6 is a top view illustrating a spreading shape of the glass melt G in the float bath 100 according to an exemplary embodiment of the present disclosure.

Referring to FIG. 6, in the float bath 100 according to an exemplary embodiment of the present disclosure, the metal melt M is received by an inner wall 102 of the metal melt M, and the glass melt G is poured onto the metal melt M through the spout lip 101. However, according to the present disclosure, the guiding unit 110 is installed at a part where the glass melt G is poured. Accordingly, the side of the glass melt G indicated by 'c' in the drawing comes into contact with the inner side b of the guiding unit 110, as a result, interfacial tension is not formed at the side of the glass melt G. Accordingly, the glass melt G may spread out along the inner side b of the guiding unit 110. That is, initially, the poured glass melt G may spread out on the metal melt M in a shape indicated by a solid line d1 in FIG. 6. Also, as time goes by, the glass melt G may gradually spread out to locations of d2 and d3 as indicated by an arrow. However, FIG. 6 is just for the purpose of chronologically illustrating the side of the glass melt G spreading out while coming into contact with the inner side of the guiding unit 110 in the float bath 100 according to an exemplary embodiment of the present disclosure, and a specific spreading shape of the glass melt G may have a different shape.

Like this, according to one aspect of the present disclosure, when the glass melt G poured at the upstream of the float bath 100 spreads out, the glass melt G spreads out while the side of the glass melt G comes into contact with the inner side of the guiding unit 110, so the glass melt G may spread more quickly. This effect is described in further detail with reference to FIG. 7.

Figure 7:
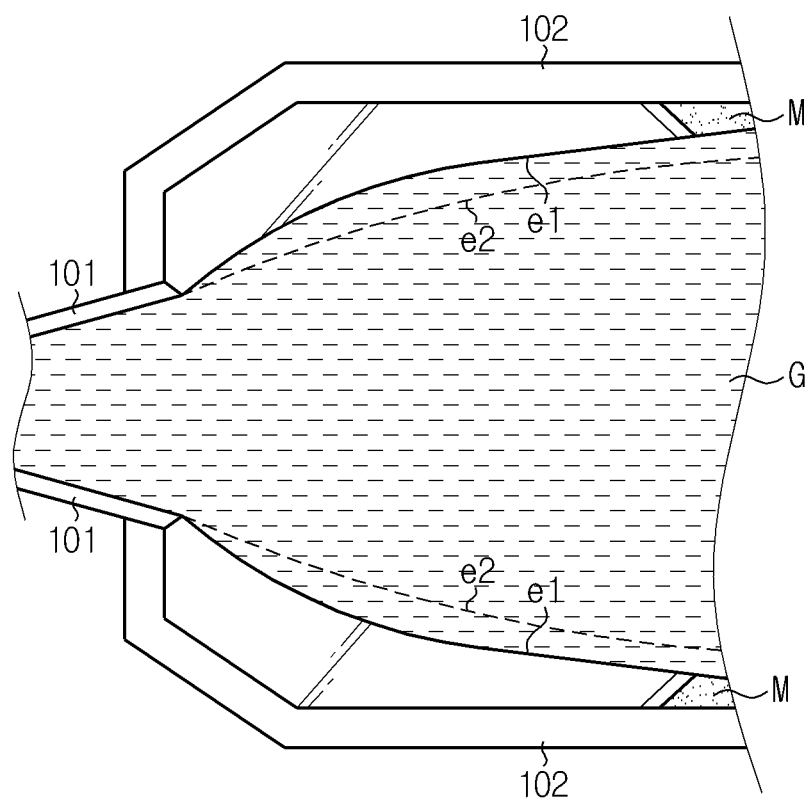
FIG. 7 is a top view illustrating a comparison of a spreading shape of a glass melt in a float bath according to an exemplary embodiment of the present disclosure and a spreading shape of a glass melt in a float bath according to a related art.

FIG. 7 is a top view illustrating a comparison of a spreading shape of a glass melt in the float bath 100 according to an exemplary embodiment of the present disclosure and a spreading shape of a glass melt in a float bath according to a related art. More specifically, in FIG. 7, a solid line e1 represents the spreading shape of the glass melt in the float bath 100 according to an exemplary embodiment of the present disclosure, and a solid line e2 represents the spreading shape of the glass melt in the conventional float bath.

Referring to FIG. 7, because the float bath 100 according to an exemplary embodiment of the present disclosure is equipped with the guiding unit 110 installed at the part where the glass melt G is poured, the glass melt G may spread out along the inner side of the guiding unit 110 at the early stage of pouring, as indicated by the solid line e1. Here, e1 may represent the inner side of the guiding unit 110 and the side of the glass melt G at the same time.

Figure 1:
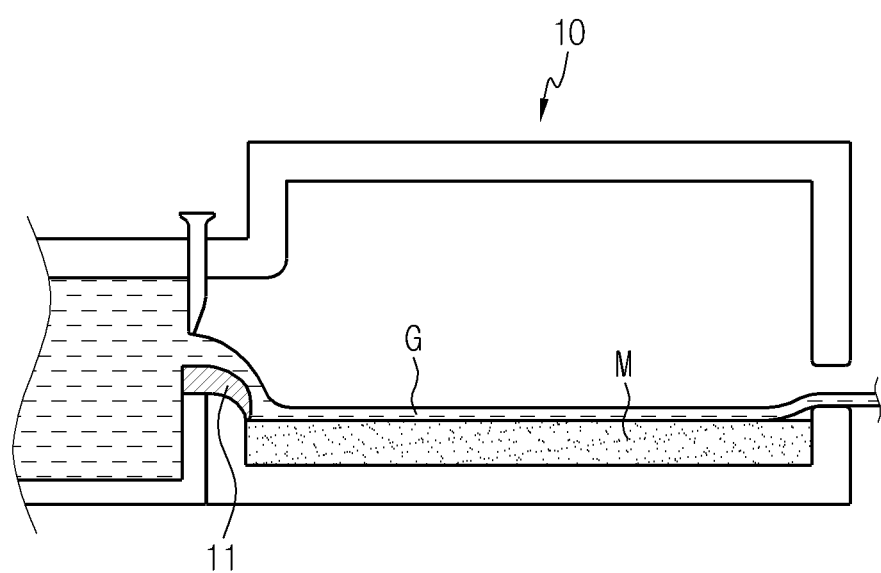
FIG. 1 is a diagram schematically illustrating a partial construction of an apparatus for manufacturing a float glass according to a related art.
Figure 2:
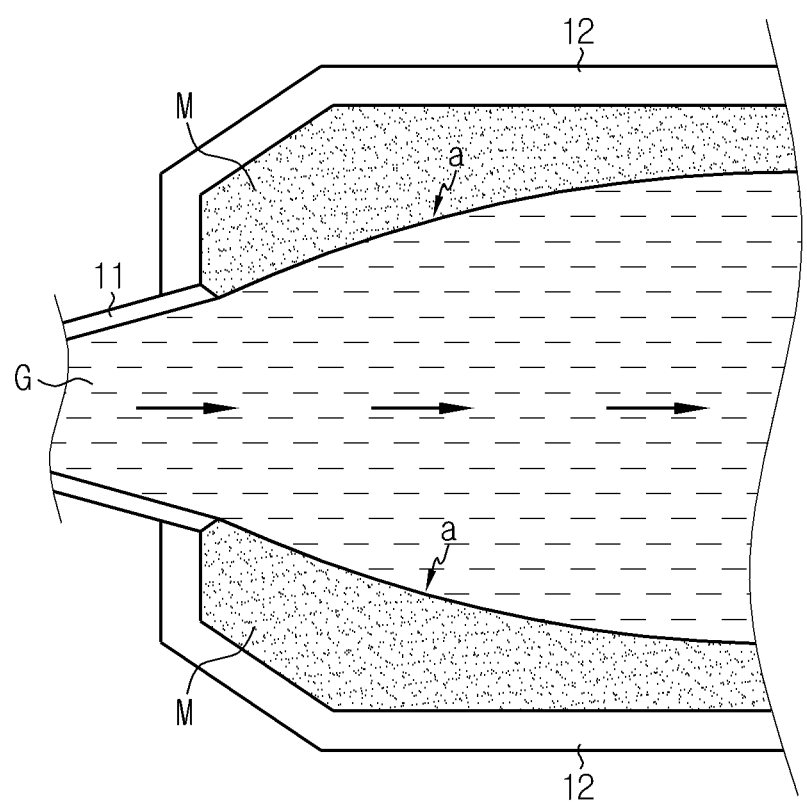
FIG. 2 is a diagram illustrating a spreading shape of a glass melt poured through an inlet of a float bath according to a related art when viewed from the top of the float bath.

In contrast, in the case of the conventional float bath, the guiding unit 110 is not installed at the inlet of the float bath as shown in FIGS. 1 and 2. Accordingly, the side of the poured glass melt spreads out less than that of the present disclosure, as indicated by e2 in FIG. 7, by interfacial tension formed at a free interface or other reasons.

That is, according to the present disclosure, because the guiding unit 110 guides the sidewise spreading path of the glass melt while coming into contact with the side of the glass melt poured into the float bath 100, the sidewise spreading of the glass melt may be expanded as much as a difference between e1 and e2, and a spreading speed may be improved.

Accordingly, it is advantageous that a shape of the inner side of the guiding unit 110 according to the present disclosure has a wider width than a width of the glass melt spreading out naturally under the influence of interfacial tension or the like within the conventional float bath without the guiding unit. For example, in the embodiment of FIG. 7, preferably, the inner side of the left guiding unit 111 is located at the far left side than e2, as indicated by e1 at the left side (upper side in FIG. 7), and the inner side of the right guiding unit 112 is located at the far right side than e2, as indicated by e1 at the right side.

Also, the shape of the inner side of the guiding unit 110 may be variously configured. Because the side of the glass melt spreads along the inner side of the guiding unit 110, the spreading shape of the glass melt is found to follow the shape of the inner side of the guiding unit 110. Accordingly, to obtain a desired spreading shape of the glass melt, it may be achieved by modifying the shape of the inner side of the guiding unit 110.

Meanwhile, although FIGS. 6 and 7 show that an outer side of the guiding unit 110 has a similar shape to the shape of the inner wall 102 of the float bath to attach to the inner wall 102 of the float bath, this is for illustration only and the outer side of the guiding unit 110 may be implemented in various shapes.

Preferably, the guiding unit 110 may have a shape to allow the glass melt to have a wider width as going from the upstream of the float bath 100 to the downstream. That is, as shown in FIGS. 6 and 7, the left guiding unit 111 and the right guiding unit 112 may have a shape that a distance therebetween, to be exact, a distance between the inner side of the left guiding unit 111 and the inner side of the right guiding unit 112 becomes farther as going in a left to right direction.

However, this embodiment is just an example, and the guiding unit 110 may be implemented in a different shape. For example, the guiding unit 110 may have a shape that a distance between the left guiding unit 111 and the right guiding unit 112 increases as going from the upstream of the float bath 100 to the downstream, and from a predetermined point and thereafter, the distance between the left guiding unit 111 and the right guiding unit 112 maintains equally.

Meanwhile, a height of the guiding unit 110 is preferably higher than a height of the glass melt floating on the metal melt M, as shown in FIG. 3. More specifically, a height of the inner side of the guiding unit 110 is preferably higher than a height of the side of the glass melt. In case in which the height of the inner side of the guiding unit 110 is lower than the height of the side of the glass melt, the side of the glass melt fails to come into contact with the inner side of the guiding unit 110 well, as a result, the guiding unit 110 may not guide the spread of the glass melt well.

Also, preferably, the guiding unit 110 is disposed such that a bottom of the guiding unit 110 is at the same level as a height of a top of the metal melt M, as shown in FIG. 3. If at least a part of the guiding unit 110 is submerged in the metal melt M, the guiding unit 110 may be damaged due to buoy by the metal melt M. In contrast, if the bottom of the guiding unit 100 is spaced a predetermined distance away from the top of the metal melt M, the side of the glass melt fails to come into contact with the inner side of the guiding unit 110, and an effect of guiding the spreading path of the glass melt by the guiding unit 110 may reduce. Therefore, like the above embodiment, it is preferred to install the guiding unit 110 to keep the height of the bottom of the guiding unit 110 level with the top of the tin melt.

Also, the guiding unit 110 may have a shape that a downstream side end in the float bath 100 reduces in height toward an edge. Here, an end height of the guiding unit 110 represents a vertical length when the guiding unit 110 is viewed from the side. That is, as shown in FIG. 3, a right edge of the guiding unit 110 preferably has a wedge-like pointed shape. According to this embodiment, when the glass melt spreads and moves along the inner side of the guiding unit 110 and arrives at the right end of the guiding unit 110 from which the glass melt leaves, the glass melt may favorably leave by a reduction in contact area with the guiding unit 110.

Meanwhile, the guiding unit 110 may be 1 m to 10 m long in an upstream to downstream direction of the float bath 100. That is, in FIG. 3, a length of the guiding unit 110 from the left end to the right end may be 1 m to 10 m. This length of the guiding unit 110 allows the glass melt poured into the float bath 100 to spread quickly and sufficiently. However, this length of the guiding unit 110 may be determined differently based on a variety of many conditions including a size or an internal temperature of the float bath 100, a type of the glass melt, and the like, and the present disclosure is not limited by a specific length of the guiding unit 110. For example, the guiding unit 110 may be formed in an elongated shape from the inlet of the float bath 100 to the outlet.

Also, the guiding unit 110 may have a width of 20 mm to 200 mm at the downstream side end in the float bath 100. Within this width range of the guiding unit 110, the spreading of the glass melt may be performed more favorably. However, the present disclosure is not limited to this shape, and the end width of the guiding unit 110 may be configured variously.

Also, preferably, the guiding unit 110 may include an expanding part and a leaving part in an upstream to downstream direction of the float bath 100. Its detailed description is provided with reference to FIG. 8.

Figure 8:
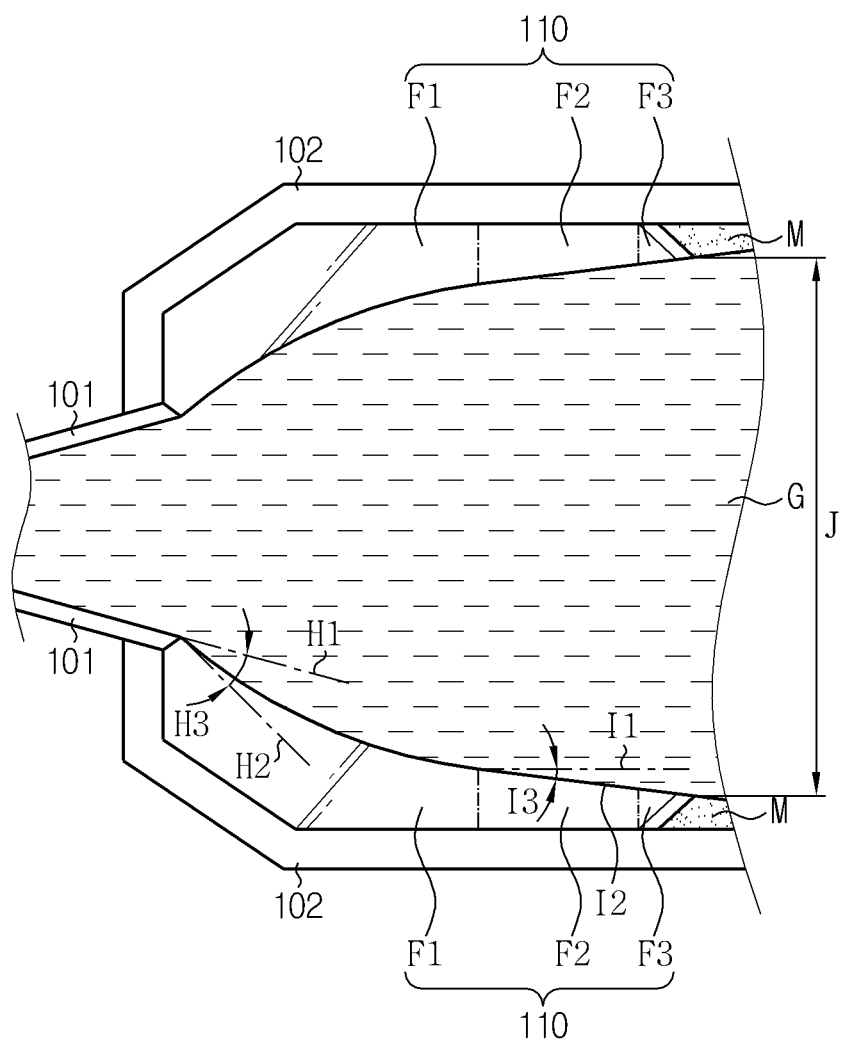
FIG. 8 is a top view schematically illustrating a shape of a guiding unit according to an exemplary embodiment of the present disclosure.

FIG. 8 is a top view schematically illustrating the shape of the guiding unit 110 according to an exemplary embodiment of the present disclosure.

Referring to FIG. 8, the guiding unit 110 may be constructed to include an expanding part F1 and a leaving part F3.

The expanding part F1 is located at the upstream side of the float bath 110 among the guiding unit 110, and is a part the glass melt G comes into contact with for the first time after the glass melt G is poured into the float bath 100. The expanding part F1 expands the sidewise spreading of the poured glass melt G. That is, when the glass melt G expands in the sidewise direction, the expanding part F1 allows the glass melt G to expand with a wider width than the glass melt G naturally expanding without the guiding unit 110.

To do so, the expanding part F1 may be formed such that at least a portion of the part coming into contact with the side of the glass melt G is curved in a travel direction of the glass melt G. For example, an inner side of the expanding part F1 may be formed in a curved shape as a whole from a part where an end of the spout lip 101 is located, as shown in FIG. 8.

In this case, the expanding part F1 is preferably constructed such that a tangent direction of the part the poured glass melt G initially comes into contact with forms an angle between 10° and 30° with a lengthwise direction of the side of the glass melt G before the contact with the expanding part F1.

For example, referring to illustration shown in FIG. 8, when a line extending from an inner side of the spout lip 101 where the glass melt G is poured into the float bath 100 is I1, I1 may be the same as the lengthwise direction of the side of the glass melt G before the contact with the expanding part F1 of the guiding unit 110. Also, when the tangent direction of the part where the glass melt G initially comes into contact with the expanding part F1 of the guiding unit 110 is I2, an angle formed by I1 and I2 is given H3. In this case, H3 may be an initial angle between the guiding unit 110 and the spout lip 101, and the expanding part F1 is preferably constructed so that this angle is from 10° to 30°. This is because, within this angle range, the glass melt G may spread most widely along the expanding part F1 of the guiding unit 110 and prevention of the glass melt G from separating from the expanding part F1 of the guiding unit 110 may be facilitated.

Meanwhile, as in the above embodiment, when at least a portion of the inner side of the expanding part F1 is constructed in a shape of a curve, a radius of curvature of the part constructed in the shape of the curve may be determined based on the initial angle H3 between the guiding unit 110 and the spout lip 101 and the length of the expanding part F1 (flow direction of the glass melt).

Preferably, the radius of curvature of the inner side of the expanding part F1 is preferably greater 1 to 5 times than a width of the glass melt at a shortest end of the guiding unit 110. Here, the shortest end of the guiding unit 110 represents a part located at a most downstream side of the float bath among the guiding unit 110, namely, a most distal end of the leaving part F3 from which the glass melt leaves. That is, the radius of curvature of the expanding part F1 preferably has a larger size 1 to 5 times than the width (indicated by J in FIG. 8) of the glass melt G at the moment for the glass melt G to leave from the guiding unit 110. If the radius of curvature of the expanding part F1 is excessively small, there is a problem that the initial angle H3 needs to be beyond a proper range to increase to a desired width of the guiding unit 110. In contrast, if the radius of curvature is excessively large, an angle or a step at a point of connection with an adjacent part such as a stabilization unit F2 is formed, and as a consequence, there is a problem that the sidewise spreading of the glass melt G may not be stably achieved. However, this problem does not occur within the above range of radius of curvature.

The leaving part F3 is located at the most distal end of the guiding unit 110 in the flow direction of the glass melt G, where the glass melt G leaves from the guiding unit 110. Here, a length of the leaving part F3 in the flow direction of the glass melt G may be configured long enough to cause the glass melt G to leave from the guiding unit 110 slowly. However, in consideration of an overall length or ease of manufacture of the guiding unit 110, the length of the leaving part F3 may preferably be from 0.01 m to 0.1 m. Meanwhile, this length of the leaving part F3 may vary depending on various factors such as the overall length of the guiding unit 110 or the float bath 100, the width of the glass melt G, the internal temperature of the float bath 100, and the like.

Meanwhile, the leaving part F3 may have a shape that its height decreases as going toward the downstream of the float bath 100. That is, as shown in FIG. 3, the leaving part F3 located at the right end of the guiding unit 110 may have a pointed shape as going toward the end. According to this embodiment, when the glass melt G leaves from the leaving part F3, the glass melt G may favorably leave by a reduction in contact area with the guiding unit 110.

Also, preferably, the guiding unit 110 may further include a stabilizing part F2 between the expanding part F1 and the leaving part F3.

The stabilizing part F2 may stabilize the spread of the glass melt G expanded by the expanding part F1. That is, the stabilizing part F2 may stably maintain the spreading speed of the glass melt G. Also, the stabilizing part F2 may stabilize the temperature of the glass melt G by lowering the temperature of the glass melt G sequentially along the flow direction.

To do so, an inner side of the stabilizing part F2 coming into contact with the glass melt G may be formed in a linear shape. In this case, the stabilizing part F2 may be preferably constructed such that a lengthwise direction of a part coming into contact with the side of the glass melt G forms an angle between 0° and 10° with the travel direction of the glass melt G. That is, referring to illustration shown in FIG. 8, when the travel direction of the glass melt G is given I1 and a lengthwise line of the inner side of the stabilizing part F2 is given I2, the stabilizing part F2 may be preferably constructed such that an angle between I1 and I2 is from 0° to 10°.

Also, the stabilizing part F2 may be preferably constructed such that the lengthwise direction of the inner side is coincident with a tangent direction of the expanding part F1 at a point where the expanding part F1 and the stabilizing part F2 intersect. That is, in FIG. 8, I2 is preferably coincident with a tangent of the expanding part F1 at the shortest end of the expanding part F1. According to this embodiment, the expanding part F1 may be stably connected with the stabilizing part F2 without any big change, thereby preventing the side of the glass melt G from separating from the guiding unit 110 at the point of connection therebetween.

The stabilizing part F2 may be constructed such that a length in the flow direction of the glass melt G is in a range of 0.5 m to 2 m. However, this length of the stabilizing part F2 may change based on the length of the guiding unit 110 or the float bath 100, the width of the glass melt G, the internal temperature of the float bath 100, and the like.

When the guiding unit 110 is equipped with the stabilizing part F2 as described above, the leaving part F3 may be provided at a next location adjacent to the stabilizing part F2. In this instance, the inner side of the leaving part F3 may be also formed in a linear shape, and a straight line formed by the inner side of the leaving part F3 may be coincident with a straight line formed by the inner side of the stabilizing part F2. In this case, the stabilizing part F2 may be constructed to have a uniform height or a less height difference as going toward the downstream of the float bath, and the leaving part F3 may be constructed to have a lower height as going toward the downstream of the float bath, distinguishably from the stabilizing part F2.

Meanwhile, because the guiding unit 110 is disposed within the high temperature float bath 100 and comes into contact with the high temperature glass melt, any material having heat resistance such as refractory is preferred, and the present disclosure is not limited by a specific material of the guiding unit 110.

The apparatus for manufacturing a float glass according to the present disclosure may include the foregoing-described float bath 100. That is, the apparatus for manufacturing a float glass according to the present disclosure may include the float bath 100 equipped with the guiding unit at the upstream side. Also, along with the float bath 100, the apparatus for manufacturing a float glass according to the present disclosure may further include a glass melt providing unit to provide a glass melt to the float bath 100, and an annealing furnace to perform an annealing process on a glass ribbon pulled off from the float bath 100, to manufacture a float glass.

Figure 9:
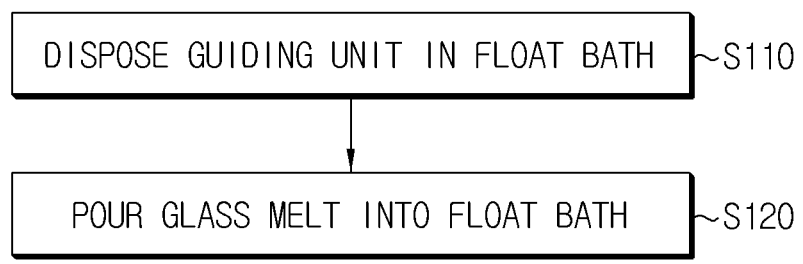
FIG. 9 is a flowchart schematically illustrating a method for manufacturing a float glass according to an exemplary embodiment of the present disclosure.

FIG. 9 is a flowchart schematically illustrating a method for manufacturing a float glass according to an exemplary embodiment of the present disclosure.

Referring to FIG. 9, the method for manufacturing a float glass according to the present disclosure includes a step of disposing the guiding unit 110 (S110), and a step of pouring a glass melt (S120).

The step (S110) of disposing the guiding unit 110 is a step of disposing the guiding unit 110 at the side of the inlet of the float bath. Here, as described in the foregoing, when a glass melt is poured onto a metal melt M, the guiding unit 110 is a member which comes into contact with the side of the glass melt and guides a sidewise spreading path of the glass melt. In particular, in the present disclosure, the guiding unit may be constructed to expand sidewise spreading of the glass melt when compared to a case in which the glass melt naturally spreads without the guiding unit in the float bath.

Subsequently, the step (S120) of pouring a glass melt is a step of pouring the glass melt into the float bath. In this instance, because the guiding unit 110 is disposed, through the step S110, at the side of the inlet of the float bath where the glass melt is poured, the glass melt is poured onto the glass melt at the part where the guiding unit 110 is disposed.

Preferably, in the step S110, the left guiding unit 111 and the right guiding unit 112 having a symmetrical shape may be disposed at both sides of the float bath.

Here, the left guiding unit 111 and the right guiding unit 112 may be disposed such that they gradually go further apart from each other as going in an upstream to downstream direction of the glass melt.

Also, preferably, in the step S110, the guiding unit 110 may be disposed such that the bottom of the guiding unit 110 is level with the top of the metal melt.

Also, in the step S110, the guiding unit 110 may be disposed such that a downstream side end in the float bath reduces in height toward an edge. Here, the disposing of the guiding unit 110 with the downstream side end reducing in height toward the edge may be achieved through the shape of the guiding unit 110 itself. That is, by making the downstream side end of the guiding unit 110 have a pointed shape, the downstream side end of the guiding unit 110 reduces in height toward the edge. Also, even if the downstream side end of the guiding unit 110 does not have a pointed shape, it may be achieved by adjusting the displacement of the guiding unit 110. That is, by disposing the guiding unit 110 such that the guiding unit 110 gradually reduces in height with respect to the top of the metal melt, the downstream side end of the guiding unit 110 may reduce in height toward the edge.

Meanwhile, a glass ribbon formed in the float bath through the step S120 may be pulled off through the outlet of the float bath, and may be fed into the annealing furnace to undergo an annealing process.

The float glass according to the present disclosure is a glass manufactured by the method for manufacturing a float glass described in the foregoing. Also, the float glass according to the present disclosure is a glass manufactured using the apparatus for manufacturing a float glass described in the foregoing.

Hereinabove, the present disclosure has been described by the limited examples and drawings, but is not limited thereto, and it should be understood that various changes and modifications may be made by those skilled in the art within the spirit of the disclosure and the equivalent scope of the appended claims.

Meanwhile, the terms indicating up, down, left and right directions are used in the specification, but it is obvious to those skilled in the art that these merely represent a relative location and may vary based on a location of an observer or a shape in which an object is placed.

What is claimed is:

1. A float bath which receives a metal melt, and allows a glass melt poured onto the metal melt through a spout lip to float and move from upstream to downstream, the float bath comprising:
a guiding unit provided at a part where the glass melt is poured, coming into contact with the sides of the poured glass melt to guide a sidewise spreading path of the glass melt to expand sidewise spreading of the poured glass melt,
wherein:
the guiding unit comprises an expanding part to expand the sidewise spreading of the glass melt, and a leaving part to allow the glass melt to leave,
the guiding unit has a shape that a downstream side end in the float bath reduces in height toward an edge, such that an edge of the guiding unit in contact with the glass melt has a wedge-like pointed shape,
a part of the expanding part comes into contact with the side of the glass melt,
at least a portion of the part of the expanding part coming into contact with the side of the glass melt is formed in a curved shape along a travel direction of the glass melt,
the expanding part is constructed such that a tangent direction of a part the poured glass melt initially comes into contact with forms an angle between 10° and 30° with a lengthwise direction of the side of the glass melt before the contact with the expanding part, and
an inner side of the expanding part is formed in a curved shape as a whole from a part where an end of the spout lip is located.

2. The float bath according to claim 1, wherein the guiding unit includes a left guiding unit and a right guiding unit, and the left guiding unit and the right guiding unit have a symmetrical shape.

3. The float bath according to claim 2, wherein the left guiding unit and the right guiding unit gradually go further apart from each other as going from upstream to downstream of the float bath.

4. The float bath according to claim 1, wherein the guiding unit is disposed such that a bottom of the guiding unit is level with a top of the metal melt.

5. The float bath according to claim 1, wherein a length of the guiding unit in an upstream to downstream direction of the float bath is from 1 m to 10 m.

6. The float bath according to claim 1, wherein the guiding unit further comprises a stabilizing part to stabilize a spreading speed of the glass melt.

7. The float bath according to claim 6, wherein the stabilizing part is constructed such that a lengthwise direction of a part coming into contact with the side of the glass melt forms an angle between 0° and 10° with a travel direction of the glass melt.

8. A float bath which receives a metal melt, and allows a glass melt poured onto the metal melt through a spout lip to float and move from upstream to downstream, the float bath comprising:

a guiding unit provided at a part where the glass melt is poured, coming into contact with the sides of the poured glass melt to guide a sidewise spreading path of the glass melt to expand sidewise spreading of the poured glass melt, wherein:

the guiding unit comprises an expanding part to expand the sidewise spreading of the glass melt, and a leaving part to allow the glass melt to leave, a part of the expanding part comes into contact with the side of the glass melt, at least a portion of the part of the expanding part coming into contact with the side of the glass melt is formed in a curved shape along a travel direction of the glass melt, the expanding part is constructed such that a tangent direction of a part the poured glass melt initially comes into contact with forms an angle between 10° and 30° with a lengthwise direction of the side of the glass melt before the contact with the expanding part, the expanding part has a radius of curvature greater 1 to 5 times than a width of the glass melt at a shortest end of the guiding unit, and an inner side of the expanding part is formed in a curved shape as a whole from a part where an end of the spout lip is located.

9. An apparatus for manufacturing a float glass comprising the float bath according to claim 1.

* * * * *